United States Patent
Tier et al.

(10) Patent No.: US 11,539,104 B2
(45) Date of Patent: Dec. 27, 2022

(54) BATTERY PILLAR PROTECTOR

(71) Applicant: Toyota Motor Engineering & Manufacturing North America, Inc., Plano, TX (US)

(72) Inventors: Matthew C. Tier, South Lyon, MI (US); Valerie Schnabelrauch, Ypsilanti, MI (US); Ziwei Zeng, Canton, MI (US); Ryan A. Mikolaizik, Ypsilanti, MI (US); Donald Maynard, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 341 days.

(21) Appl. No.: 16/853,563

(22) Filed: Apr. 20, 2020

(65) Prior Publication Data

US 2021/0328205 A1    Oct. 21, 2021

(51) Int. Cl.
| | |
|---|---|
| *H01M 50/579* | (2021.01) |
| *B62D 21/15* | (2006.01) |
| *B62D 25/08* | (2006.01) |
| *H01M 50/20* | (2021.01) |
| *H01M 50/242* | (2021.01) |
| *H01M 50/593* | (2021.01) |

(52) U.S. Cl.
CPC .......... *H01M 50/579* (2021.01); *B62D 21/15* (2013.01); *B62D 25/087* (2013.01); *H01M 50/20* (2021.01); *H01M 50/242* (2021.01); *H01M 50/593* (2021.01); *H01M 2200/00* (2013.01); *H01M 2220/20* (2013.01)

(58) Field of Classification Search
None
See application file for complete search history.

(56) References Cited

U.S. PATENT DOCUMENTS

| | | |
|---|---|---|
| 5,643,693 A | 7/1997 | Hill et al. |
| 6,564,893 B2 | 5/2003 | Lipman |
| 8,193,770 B2 | 6/2012 | Zheng et al. |
| 9,437,853 B2 | 9/2016 | Kang et al. |
| 9,536,641 B2 | 1/2017 | Toyama et al. |

(Continued)

FOREIGN PATENT DOCUMENTS

| | | |
|---|---|---|
| DE | 102011102412 A1 | 11/2012 |
| DE | 102013102502 A1 | 9/2014 |

(Continued)

OTHER PUBLICATIONS www.espacenet.com machine translation of the detailed description of JP2019-018782A. (Year: 2019).*

*Primary Examiner* — Gregg Cantelmo (74) *Attorney, Agent, or Firm* — Snell & Wilmer LLP (57) ABSTRACT

A system for reducing the likelihood of a battery short during a collision of a vehicle includes a metallic structure coupled to a portion of the vehicle. The system further includes a battery located proximate to the metallic structure and having a positive terminal. The system further includes an insulator coupled to the metallic structure such that it is located between the metallic structure and the positive terminal of the battery and configured to resist contact between the metallic structure and the positive terminal of the battery in response to the collision of the vehicle.

20 Claims, 4 Drawing Sheets

(56) References Cited

U.S. PATENT DOCUMENTS

| | | |
|---|---|---|
| 9,748,619 B2 | 8/2017 | Iida |
| 10,044,006 B2 | 8/2018 | Maier |
| 2015/0273996 A1* | 10/2015 | Onodera ................. B60L 50/64 |
| | | 429/100 |
| 2018/0205058 A1 | 7/2018 | Lee et al. |
| 2019/0199018 A1 | 6/2019 | Tsuchiya |
| 2019/0280253 A1 | 9/2019 | Ishimatsu et al. |
| 2019/0379017 A1* | 12/2019 | Kameyama ........... B60L 3/0007 |

FOREIGN PATENT DOCUMENTS

| | | | |
|---|---|---|---|
| DE | 102017116473 A1 | | 1/2019 |
| JP | 2002186101 A | | 6/2002 |
| JP | 2013008524 A | * | 1/2013 |
| JP | 2013026111 A | * | 2/2013 |
| JP | 2018125255 A | | 8/2018 |
| JP | 2019018782 A | * | 2/2019 |

* cited by examiner

BATTERY PILLAR PROTECTOR

BACKGROUND

1. Field

The present disclosure relates to systems and methods for reducing the likelihood of an electrical short of a vehicle battery during a collision of the vehicle.

2. Description of the Related Art

Vehicles generally include one or more battery. Such batteries are used for various functions. For example, the batteries may store electrical energy usable by various accessories of the vehicle (such as a stereo system, vehicle lighting, HVAC and heating systems, or the like). The batteries may also or instead store electrical energy usable by an ignition system to ignite the vehicle engine to start the engine. The batteries may also or instead store electrical energy usable by a motor generator to generate mechanical energy usable to propel the vehicle, and to store electrical energy generated by the motor generator during a regenerative braking event and/or electrical energy generated by a fuel-cell circuit of the vehicle.

The positive terminal of the battery is connected to vehicle components which receive the electrical energy, and the negative terminal of the battery is generally connected to an electrical ground (which is connected to some or all metallic structures of the vehicle). In that regard and in response to contact between a metallic vehicle structure and the positive terminal, an electrical short of the battery may occur. Such electrical short of the battery is undesirable. Such contact may occur, for example, in response to a collision between the vehicle and another object, which may deform the metallic structure of the vehicle in such a way that the metallic structure contacts the positive terminal of the battery.

Thus, there is a need in the art for systems and methods for reducing the likelihood of such an electrical short of a vehicle battery in response to a collision experienced by the vehicle.

SUMMARY

Described herein is a system for reducing the likelihood of a battery short during a collision of a vehicle. The system includes a metallic structure coupled to a portion of the vehicle. The system further includes a battery located proximate to the metallic structure and having a positive terminal. The system further includes an insulator coupled to the metallic structure such that it is located between the metallic structure and the positive terminal of the battery and designed to resist contact between the metallic structure and the positive terminal of the battery in response to the collision of the vehicle.

Also described is a system for reducing the likelihood of a battery short during a collision of a vehicle. The system includes a pillar designed to provide support to the vehicle. The system further includes a battery located proximate to the pillar and having a positive terminal. The system further includes an insulator coupled to the pillar such that it is located between the pillar and the positive terminal of the battery and designed to resist contact between the pillar and the positive terminal of the battery in response to the collision of the vehicle.

Also described is a system for reducing the likelihood, of a battery short during a collision of a vehicle. The system includes a pillar designed to provide support to the vehicle. The system further includes a battery located proximate to the pillar and having a positive terminal. The system further includes an insulator coupled to the pillar such that it is located between the pillar and the positive terminal of the battery and designed to resist contact between the pillar and the positive terminal of the battery in response to the collision of the vehicle. The insulator includes a first layer facing the battery and having a first blend of polyethylene terephthalate (PET) and polypropylene (PP) that has a greater quantity of the PP than the PET. The insulator further includes a second layer adjacent to the first layer, at least partially in contact with the pillar, and having a second blend of the PET and the PP that has a greater quantity of the PET than the PP.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for protecting a vehicle battery in response to a collision of the vehicle. The systems provide various benefits and advantages such as reducing the likelihood of a metallic structure of the vehicle contacting a positive terminal of the battery. This advantageously reduces the likelihood of an electrical short of the battery. Prevention of a battery short provides the benefit of reducing the likelihood of an ignition within the vehicle, which may be caused by the metallic structure contacting the positive terminal of the battery. This advantageously reduces total damage to the vehicle during vehicle collisions and extends a lifetime of the vehicle.

An exemplary system includes a metallic structure, such as a pillar, along with a battery and an insulator. The battery may include a positive terminal and a negative terminal. The insulator may be located between the metallic structure and the positive terminal of the battery. The insulator may include any insulating material capable of deforming with the metallic structure rather than break, shatter, or crack.

Such deformation increases the likelihood that the insulator continues to insulate the positive terminal from the metallic structure in response to the collision.

Figure 1:
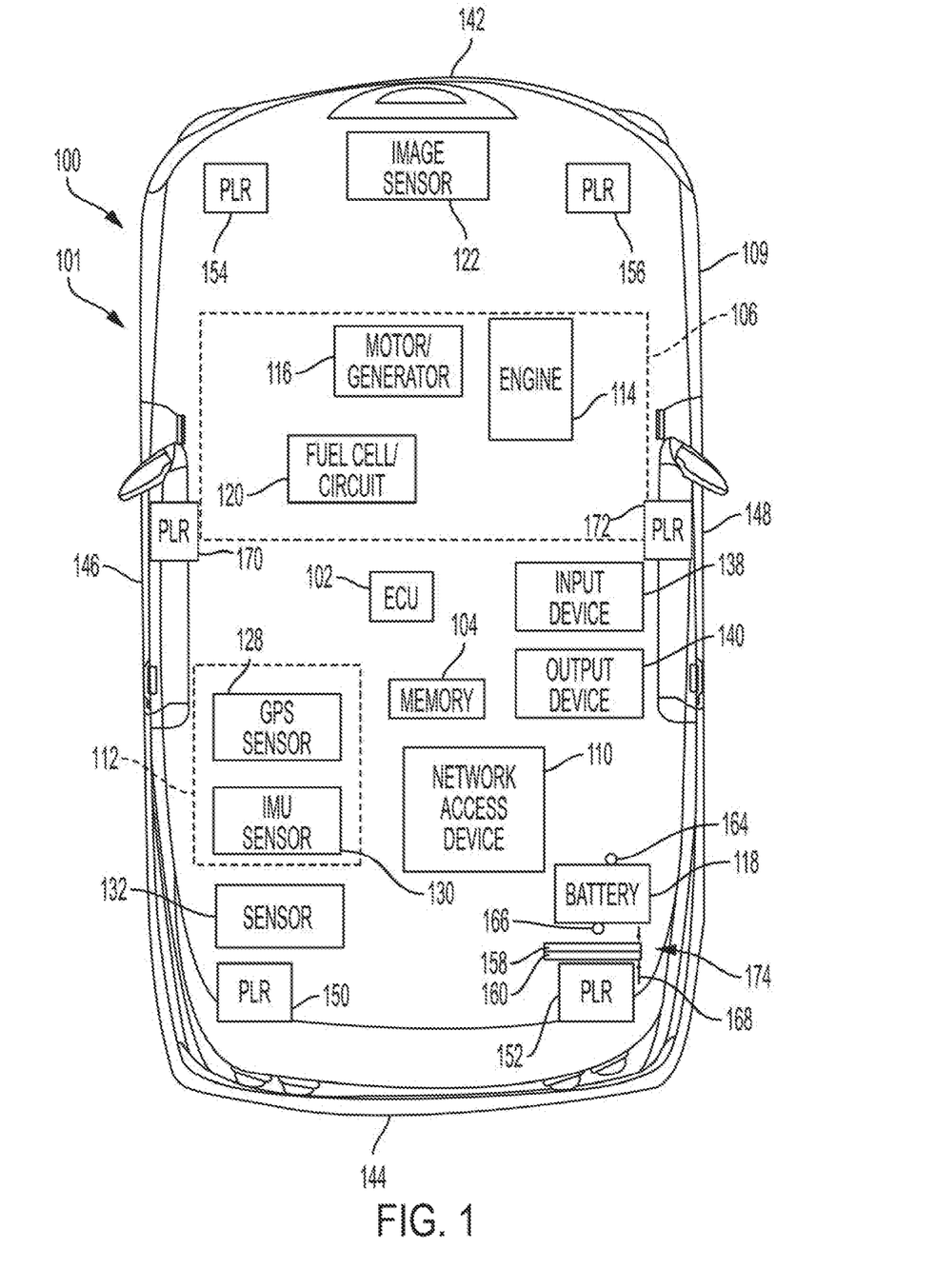
FIG. 1 is a block diagram illustrating a vehicle having a system for reducing the likelihood of a battery short in response to a collision according to an embodiment of the present invention.

Turning to FIG. 1, a vehicle 100 may include a system 101 for reducing the likelihood of a battery short during a vehicle collision. The vehicle 100 (or system 101) may include an ECU 102, a memory 104, a power source 106, and a main body 109. The vehicle 100 (or system 101) may further include a network access device 110. The vehicle 100 may further include an image sensor 122, a location sensor 112, and a sensor 132. The vehicle 100 may also include an input device 138 and an output device 140.

The main body 109 may be propelled along a roadway, may be suspended in or on water, or may fly through air. The main body 109 may resemble a vehicle such as a car, a bus, a motorcycle, a boat, an aircraft, or the like. The main body 109 may further support one or more individuals, such as a driver, a passenger, or the like.

The main body 109 may include a front 142, a rear 144, and two sides 146, 148. The main body 109 may include, Or may be coupled to, pillars 150, 152, 154, 156, 170, 172 which may provide structure and support for the main body 109. The pillars 150, 152, 154, 156, 170, 172 may include metal and may thus be conductive. Two pillars 150, 152 may be located closer to the rear 144 than the front 142, two pillars 154, 156 may be located closer to the front 142 than the rear 144, and two pillars 170, 172 may be located axially between the pillars 150, 152 and the pillars 154, 156. In that regard, the pillars 150, 152 may be referred to as rear pillars, the pillars 154, 156 may be referred to as front pillars, and the pillars 170, 172 may be referred to as B-pillars or C-pillars. In some embodiments, the vehicle 100 may include both B-pillars and C-pillars, or any additional or alternative pillars.

The ECU 102 may be coupled to, each of the components of the vehicle 100 and may include one or more processors or controllers which may be specifically designed for automotive systems. The functions of the ECU 102 may be implemented in a single ECU or in multiple ECUs. The ECU 102 may receive data from components of the vehicle 100, may make determinations based on the received data, and may control the operations of the components based on the determinations.

The vehicle 100 may be non-autonomous, fully autonomous, or semi-autonomous. In that regard, the ECU 102 may control various aspects of the vehicle 100 (such as steering, braking, accelerating, or the like) to maneuver the vehicle 100 from a starting location to a destination location. In some embodiments, the vehicle 100 may be operated in an autonomous, semi-autonomous, or fully driver-operated state. In that regard, the vehicle 100 may be operated independently of driver control and, from time to time, without a person inside of the vehicle 100. The ECU 102 may facilitate such, autonomous functionality.

The memory 104 may include any non-transitory memory and may store data usable by the ECU 102. For example, the memory 104 may store instructions usable by the ECU 102 to drive autonomously.

The power source 106 may include any one or more of an engine 114, a motor-generator 116, or a fuel cell circuit 120. The power source 106 may further include a battery 118. The engine 114 may convert a fuel into mechanical power for propelling the vehicle 100. In that regard, the engine 114 may be a gasoline engine, a diesel engine, an ethanol engine, or the like.

The battery 118 may store electrical enemy. In some embodiments, the battery 118 may include any one or more energy storage devices including a battery, a flywheel, a super capacitor, a thermal storage device, or the like. The battery 118 may be used to store power usable by the motor generator 116, power usable to start the engine 114, or the like.

The fuel-cell circuit 120 may include a plurality of fuel cells that facilitate a chemical reaction to generate electrical energy. For example, the fuel cells may receive hydrogen and oxygen, facilitate a reaction between the hydrogen and the oxygen, and output electricity in response to the reaction. In that regard, the electrical energy generated by the fuel-cell circuit 120 may be stored in the battery 118 and/or used, by the motor-generator 116 or other electrical components of the vehicle 100. In some embodiments, the vehicle 100 may include multiple fuel-cell circuits including the fuel-cell circuit 120.

The motor-generator 116 may convert the electrical energy stored, in the battery 118 (or electrical energy received directly from the fuel-cell circuit 120) into mechanical power usable to propel the vehicle 100. The motor-generator 116 may further convert mechanical power received from the engine 114 or from wheels of the vehicle 100 into electricity, which may be stored in the battery 118 as energy and/or used by other components of the vehicle 100. In some embodiments, the motor-generator 116 may include a motor without a generator portion and, in some embodiments, a separate generator may be provided.

The location sensor 112 may include any sensor capable of detecting data corresponding to a current location of the vehicle 100. For example, the location sensor 112 may include one or more of a global positioning system (GPS) sensor 128, an inertial, measurement unit (IMU) sensor 130, or the like. The GPS sensor 128 may detect data corresponding to a location of the vehicle. For example, the GPS sensor 128 may detect global positioning coordinates of the vehicle 100. The IMU sensor 130 may include one or more of an accelerometer, a gyroscope, or the like. The IMU sensor 130 may detect inertial measurement data corresponding to a position, a velocity, an orientation, an acceleration, or the like of the vehicle 100. The inertial measurement data may be used to identify a change in location of the vehicle 100, which the ECU 102 may track in order to determine a current location of the vehicle 100.

The image sensor 122 may be coupled to the main body 109 and may detect image data corresponding to an environment of the vehicle 100. For example, the image sensor 122 may include a camera, a radar detector, a lidar detector, or any other image sensor capable of detecting light having any wavelength. The image sensor 122 may include one or multiple image sensors which may be oriented to detect image data in any direction relative to the main body 109. For example, the image sensor 122 may include four or more radar detectors to, detect radar data on all four sides of the main body 109. The image sensor 122 may also or instead include a first camera to detect image data in a forward direction relative to the main body 109 and a second camera to detect image data in a rear direction relative to the main body 109.

The sensor 132 may include one or more of a sensor capable of detecting a status of a vehicle component, a sensor capable of detecting environmental conditions (including weather), a voltage sensor, a current sensor, a temperature sensor, a pressure sensor, a fuel gauge, an airflow sensor, an oxygen sensor, or the like.

The input device 138 may include any one or more input device such as a button, a keyboard, a mouse, a touchscreen, a microphone, or the like. The input device 138 may receive input from a user of the vehicle 100 such as a driver or a passenger. In some embodiments, the network access device 110 may be considered an input device as it may receive input from a remote device associated with a vehicle user.

The output device 140 may include any output device such as a speaker, a display, a touchscreen, or the like. The output device 140 may output data to a user of the vehicle such as a status of one or more vehicle component. The network access device 110 may likewise be considered an output device as it may transmit output data to a remote device, where it may be output to a vehicle user.

The network access device 110 may include any network access device capable of communicating via a wireless protocol. For example, the network access device 110 may communicate via Bluetooth, Wi-Fi, a cellular protocol, vehicle to vehicle (V2V) communications, Zigbee, or any other wired or wireless protocol. The network access device 110 may be referred to as a data communication module (DCM) and may communicate with any device on the vehicle 100 and/or any remote device. For example, the network access device 110 may communicate with at least one of a remote server (such as a cloud server or other central server) or a remote device (such as a mobile telephone, a laptop, a tablet, a desktop computer, a PDA, or the like).

The battery 118 may include a positive terminal 166 and a negative terminal 164. The negative terminal 164 may be electrically connected to a ground of the vehicle 100, which may be electrically connected to some or all metallic structures of the vehicle 100. An insulator 174 may be located between the pillar 152 and the battery 118. In particular, the insulator 174 may be located between the pillar 152 and the positive terminal 166 of the battery 118. In response to a collision located at the rear 144 of the vehicle 100, the pillar 152 may become deformed towards the positive terminal 166 of the battery 118. In response to contact between the pillar 152 and the positive terminal 166, a full circuit may be formed between the positive terminal 166 and the ground (including the negative terminal 164). The insulator 174 may be designed to deform with the pillar 152 and to insulate the pillar 152 from the positive terminal 166, thus reducing the likelihood of such electrical short occurring. Although the insulator 174 is shown as insulating the batter 118 from the pillar 152, one skilled in the art will realize that a similar insulator may be located between a battery and any vehicle pillar tor between a battery and another metallic component) without departing from the scope of the present disclosure.

In some embodiments, the insulator 174 may include a first layer 158 facing and spaced apart from the battery 118, and a second layer 160 at least one of facing or in contact with the pillar 152. In some embodiments, the insulator 174 may include more than two layers or only a single layer. The material used to form the insulator 174 may include at least one of polyethylene terephthalate (PET), polypropylene (PP), aramid fiber (e.g., KEVLAR®), rubber, carpet, or a foam. In some embodiments, the first layer 158 may include a first blend of PET and PP that has a greater quantity of the PP than the PET, and the second layer 160 may include a second blend of PET and PP that has a greater quantity of the PET than the PP. Such a combination of the PET and PP may be relatively flexible such that the insulator 174 may deform with the pillar 152 in response to a collision that includes the pillar 152.

The insulator 174 may be coupled to the rear pillar 152 in any manner such as via a fastener (e.g., a screw, a clip, a nut and bolt, or the like), an adhesive (e.g., glue or another adhesive), a press-fit, or the like.

The insulator 174 may have a thickness 168. The thickness 168 of the insulator 174 may be between 0.020 inches (0.5 millimeters) and 0.39 inches (10 millimeters), between 0.039 inches (1 millimeter) and 0.20 inches (5 millimeters), between 0.079 inches (2 millimeters) and 0.16 inches (4 millimeters), or about 0.12 inches (3 millimeters). Where used in this context, about refers to the referenced value plus or minus 10 percent of the referenced value.

Although the insulator 174 is located between a rear pillar 152 and the positive terminal 166, an insulator according to the present disclosure may be positioned between any metallic structure of the vehicle 100 and the positive terminal 166 of the battery 118.

In various embodiments, the ECU 102 may determine that a collision has occurred based on data detected by one or more of the image sensor 122, the location sensor 112, or the sensor 132, In response to determining that a collision has occurred, the ECU may also determine whether a short of the battery 118 has occurred based on data detected by the sensor 132. In response to determining that a short has occurred, the ECU may control the network access device 110 to transmit information to a remote server that includes specifics regarding the collision and regarding the electrical short. The remote server may be associated with a designer of the vehicle 100, and the designer of the vehicle 100 may use the received data to change or improve the design of the insulator 174.

Figure 2A:
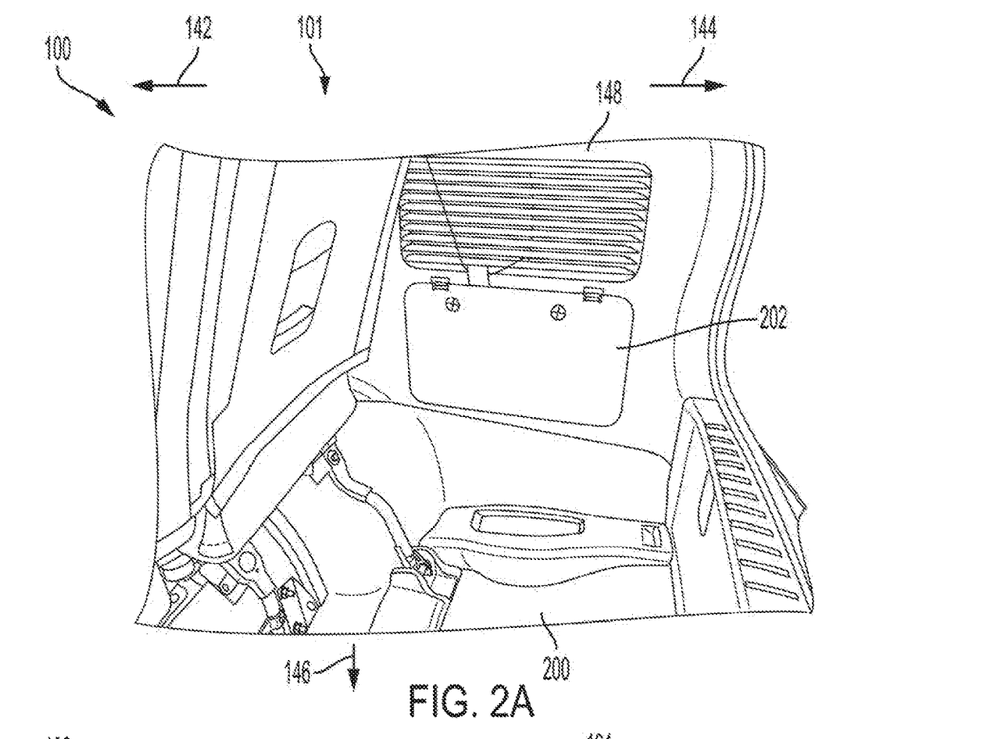
FIGS. 2A and 2B illustrate a rear cargo compartment of the vehicle of FIG. 1 including a pillar, a battery, and an insulator between the pillar and the battery according to an embodiment of the present invention.
Figure 2B:
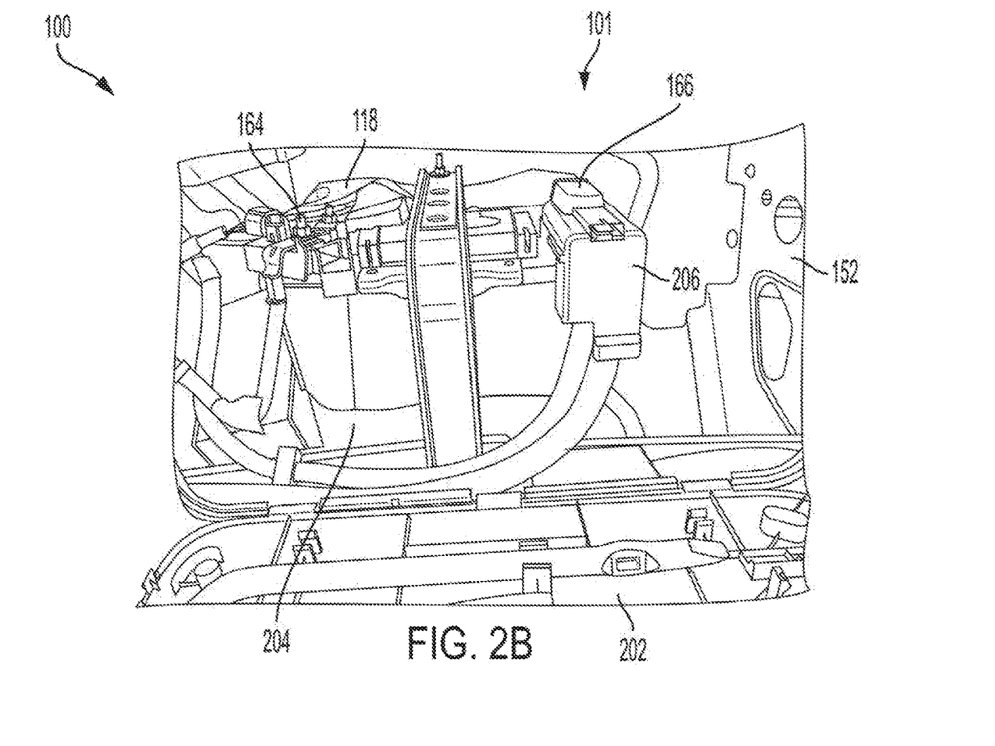

Referring now to FIGS. 2A and 2B, additional details of the system 101 are shown. In particular, the vehicle 100 may include a rear cargo compartment 200. The rear cargo compartment 200 may include a battery compartment 204 located behind a cover 202. In some embodiments, the cover 202 may be incorporated as part of a rear corner trim of the vehicle 100. The battery compartment 204 may be located closer to the rear 144 and the side 148 than to the front 142 and the other side 146 of the vehicle 101. Additionally, the pillar 152 may be exposed within the battery compartment 204.

As shown, the positive terminal 166 is closer relative to the pillar 152 than the negative terminal 164 is relative to the pillar 152. A cap or cover 206 is positioned on the rear terminal 166. However, in response to a collision which deforms the rear pillar 152, the rear pillar 152 may break, shatter, or otherwise damage the cover 206 such that the rear pillar 152 contacts the positive terminal 166.

Figure 3:
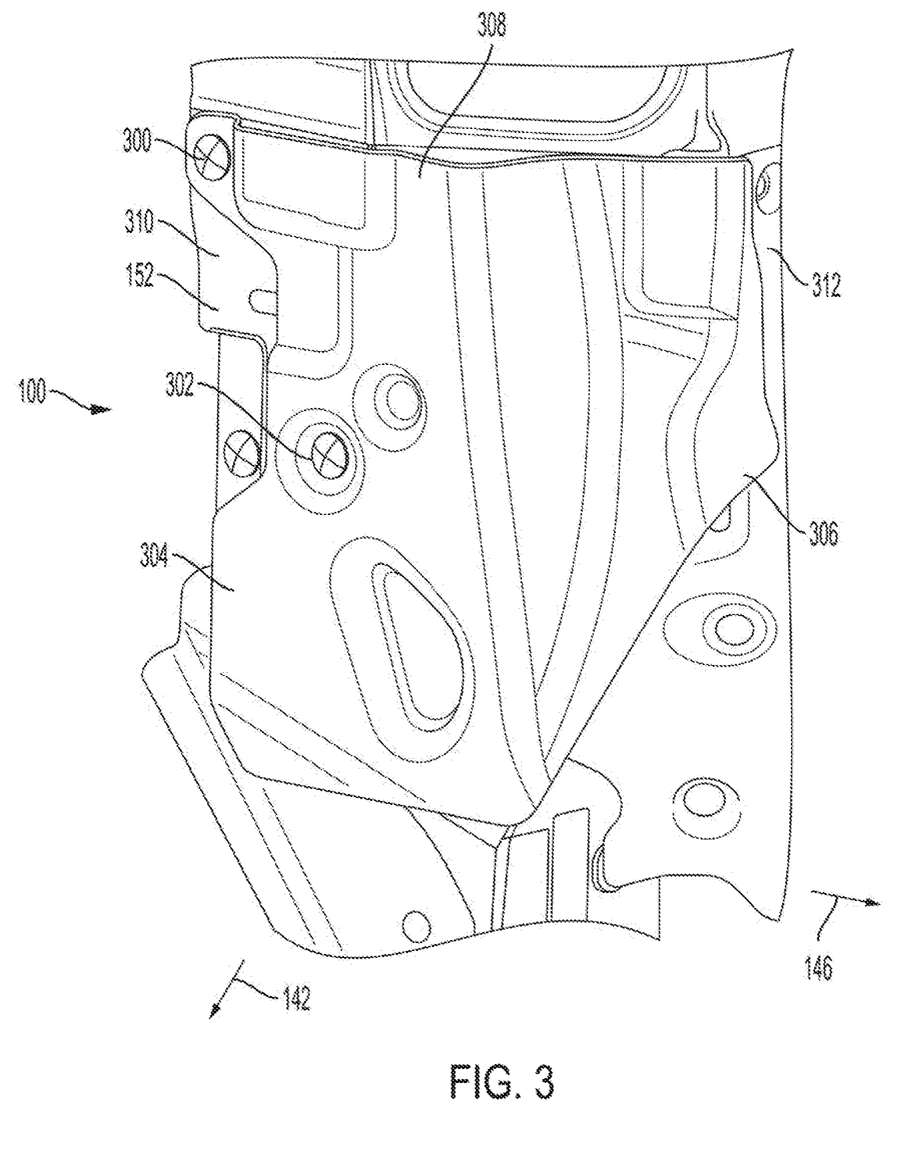
FIG. 3 is a drawing illustrating additional details of the insulator of FIGS. 2A and 2B according to an embodiment of the present invention.
Figure 4:
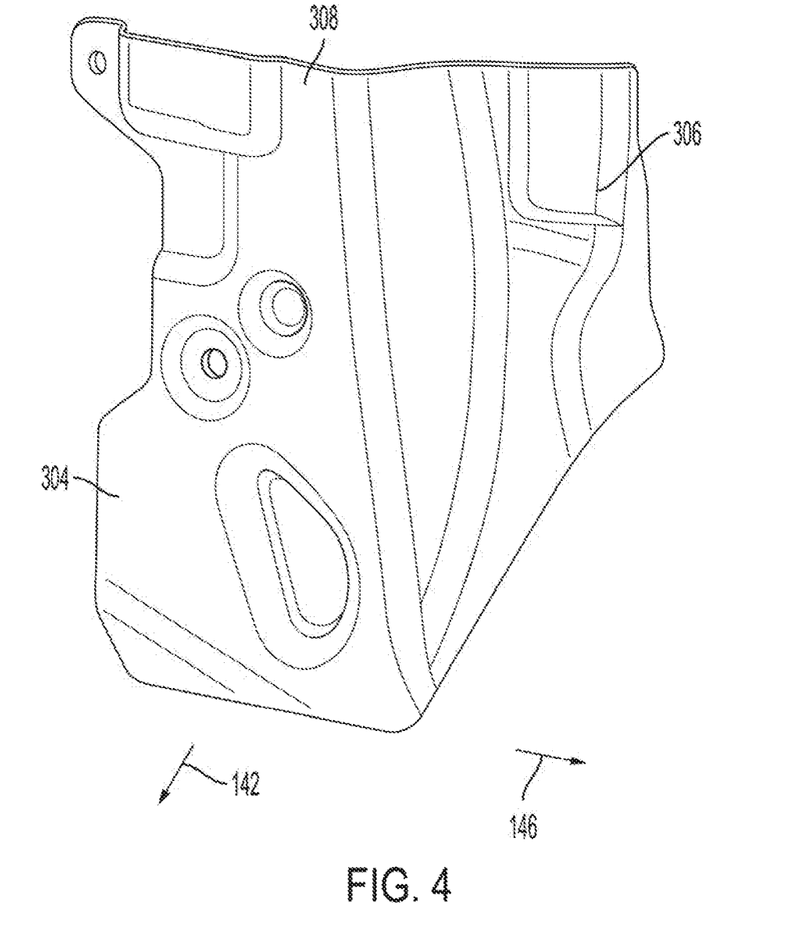
FIG. 4 is a drawing illustrating the insulator of FIG. 3 according to an embodiment of the present invention.

Referring now to FIGS. 3 and 4, additional details of the insulator 174 are shown. In particular, the insulator 174 may be coupled to the rear pillar 152 via a first fastener 300 and a second fastener 302. Additionally, the insulator 174 may be designed to at least partially conform to the shape of the rear pillar 152. In that regard, the insulator 174 may include a first portion 304, a second portion 306 extending substantially perpendicular to the first portion 304, and a bend 308 located between the first portion 304 and the second portion 306. Where used in this context, substantially refers to the referenced value 90 degrees) plus or minus 25 percent of the referenced value. The first portion 304 is designed to contact a first surface 310 of the pillar 152; the first surface 310 may face towards the front 142 of the vehicle 100. The second portion 306 is designed to contact a second surface 312 of the pillar 152; the second surface 312 may face towards the side 146 of the vehicle 100.

As shown, the insulator 174 includes various contours, shapes, cutouts (including aperture through which the fasteners 300, 302 extend), and the like. The insulator 174 may be provided as a sheet of material which may be cut and pressed to a desired shape. Additionally, the apertures or openings may be cut from the initial or pressed sheet material. The cutting may be performed using a waterjet or any other cutting tool. In that regard, the contours of the insulator 174 may be formed via pressing, and the outline and openings of the insulator 174 may be formed via cutting.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for reducing the likelihood of a battery short during a collision of a vehicle, the system comprising:
   a metallic structure coupled to a portion of the vehicle;
   a battery located proximate to the metallic structure and having a positive terminal; and
   an insulator including a first layer having a first blend of polyethylene terephthalate (PET) and polypropylene (PP) that has a greater quantity of the PP than the PET, and a second layer adjacent to the first layer and having a second blend of the PET and the PP that has a greater quantity of the PET than the PP, the insulator being coupled to the metallic structure such that it is located between the metallic structure and the positive terminal of the battery and configured to resist contact between the metallic structure and the positive terminal of the battery in response to the collision of the vehicle.

2. The system of claim 1 wherein the insulator is fastened to the metallic structure using a fastener extending through the insulator and at least a portion of the metallic structure.

3. The system of claim 1 wherein the metallic structure is a pillar of the vehicle.

4. The system of claim 3 wherein the pillar is a rear pillar of the vehicle, and the battery is located adjacent to a rear cargo compartment of the vehicle.

5. The system of claim 1 wherein the first layer faces the battery, and the second layer faces the metallic structure and is at least partially in contact with the metallic structure.

6. The system of claim 5 wherein the insulator has a thickness that is between 0.039 inches (1 millimeter) and 0.20 inches (5 millimeters).

7. The system of claim 1 wherein:
   the insulator includes a first portion, a second portion, and a bend located between the first portion and the second portion; and
   the insulator is configured to be coupled to the metallic structure such that the first portion contacts a first surface of the metallic structure that faces towards a front of the vehicle, and the second portion contacts a second surface of the metallic structure that faces towards a side of the vehicle.

8. The system of claim 1 wherein the insulator includes at least one of polyethylene terephthalate (PET), polypropylene (PP), rubber, carpet, or a foam.

9. The system of claim 1 wherein the insulator is cut and pressed to a desired shape, and has at least one opening formed using a waterjet.

10. The system of claim 1 wherein the combination of the PET and the PP is configured to be flexible such that the insulator is configured to at least partially deform to the metallic structure.

11. A system for reducing the likelihood of a battery short during a collision of a vehicle, the system comprising:
    a pillar configured to provide support to the vehicle;
    a battery located proximate to the pillar and having a positive terminal; and
    an insulator coupled to the pillar such that it is located between the pillar and the positive terminal of the battery and configured to resist contact between the pillar and the positive terminal of the battery in response to the collision of the vehicle, the insulator including a first portion, a second portion, and a bend located between the first portion and the second portion, and the insulator being configured to be coupled to the pillar such that the first portion contacts a first surface of the pillar that faces towards a front of the vehicle, and the second portion contacts a second surface of the pillar that faces towards a side of the vehicle.

12. The system of claim 11 wherein the insulator is fastened to the pillar using a fastener extending through the insulator and at least a portion of the pillar.

13. The system of claim 11 wherein the pillar is a rear pillar of the vehicle, and the battery is located adjacent to a rear cargo compartment of the vehicle.

14. The system of claim 11 wherein the insulator includes a first layer having a first blend of polyethylene terephthalate (PET) and polypropylene (PP) that has a greater quantity of the PP than the PET, and a second layer adjacent to the first layer and having a second blend of the PET and the PP that has a greater quantity of the PET than the PP.

15. The system of claim 14 wherein the first layer faces the battery, and the second layer faces the pillar and is at least partially in contact with the pillar.

16. The system of claim 15 wherein the insulator has a thickness that is between 0.039 inches (1 millimeter) and 0.20 inches (5 millimeters).

17. The system of claim 11 wherein the insulator includes at least one of polyethylene terephthalate (PET), polypropylene (PP), rubber, carpet, or a foam.

18. The system of claim 11 wherein the insulator is cut and pressed to a desired shape, and has at least one opening formed using a waterjet.

19. The system of claim 11 wherein the insulator is configured to at least partially deform to the pillar.

20. A system for reducing the likelihood of a battery short during a collision of a vehicle, the system comprising:
    a pillar configured to provide support to the vehicle;
    a battery located proximate to the pillar and having a positive terminal; and
    an insulator coupled to the pillar such that it is located between the pillar and the positive terminal of the battery and configured to resist contact between the pillar and the positive terminal of the battery in response to the collision of the vehicle, the insulator having:
       a first layer facing the battery and having a first blend of polyethylene terephthalate (PET) and polypropylene (PP) that has a greater quantity of the PP than the PET, and
       a second layer adjacent to the first layer, at least partially in contact with the pillar, and having a second blend of the PET and the PP that has a greater quantity of the PET than the PP.

\* \* \* \* \*